Patented Jan. 12, 1937

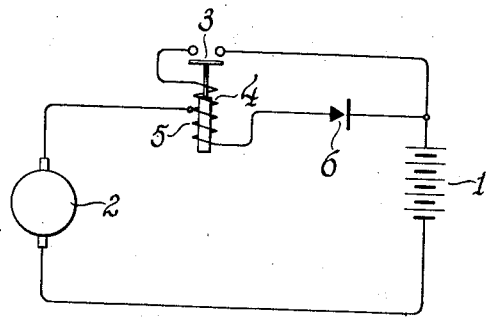
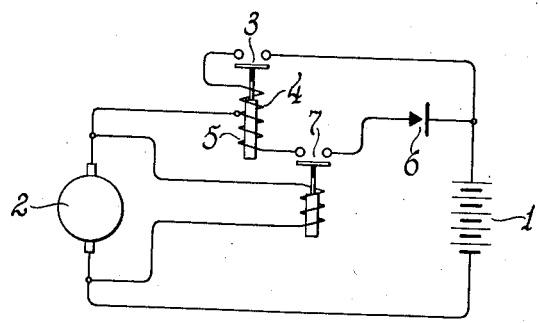

2,067,420

UNITED STATES PATENT OFFICE 2,067,420

BATTERY CHARGING SYSTEM

Edwin W. Seeger and Frank J. Russell, Wauwatosa, Wis., assignors to Cutler-Hammer, Inc., Milwaukee, Wis., a corporation of Delaware Application August 14, 1935, Serial No. 36,066

4 Claims. (Cl. 171—314)

This invention relates to improvements in battery charging systems.

More particularly the invention relates to systems wherein a battery is charged by a generator driven at a variable speed, and while not limited thereto the invention is particularly applicable to systems utilizing wind as the driving power for the generator.

As is understood, it is desired in such systems to prevent the storage battery from discharging to the generator and to this end it is common practice to employ a reverse current relay to disconnect the battery from the generator when current tends to flow from the former to the latter. However, the most sensitive of such relays have been found not wholly adequate and reliable where the variations in generator speed are such as occur in systems utilizing wind power, and it is an object of the invention to afford better protection against discharge of the battery to the generator.

Another object is to provide such better protection by simple, inexpensive and reliable means.

Other objects and advantages of the invention will hereinafter appear.

According to the present invention it is proposed to employ a relay having a compound coil with a pick-up section and a holding section and to interpose between the former section and the battery a relatively small rectifier which will pass current only from the generator to the battery. Also it is proposed to provide a permanent connection between the generator and the battery through the pick-up section of the relay coil and through the rectifier, or alternatively to employ an additional relay to make and interrupt such a connection, said pick-up section and rectifier being in either case short-circuited upon closure of the relay which in closing includes in the charging circuit the holding section of its coil.

The invention will now be described in further detail, reference being had to the accompanying drawing wherein Figure 1 illustrates diagrammatically a system wherein the connection through the rectifier is permanent, and Fig. 2 illustrates diagrammatically a system wherein the connection through the rectifier is controlled by an additional relay.

Referring to Fig. 1, the same shows a storage battery 1 to be charged by a generator 2. One terminal of the battery is connected directly to one brush of the generator, while the other terminal of the battery is adapted to be connected to the other brush of the generator through a relay 3. The relay is normally open and has a compound coil comprising sections 4 and 5. The section 4 herein called the holding section is included in circuit only when the relay is closed. The section 5 herein called the pick-up section is permanently connected between the battery and the generator through a rectifier 6 which passes current only from the generator to the battery.

The rectifier 6 is preferably of the copper oxide type comprising disks, and is preferably of a minimum size to serve as hereinafter set forth. In practice it has been found advantageous to employ a rectifier of such size that the generator may supply the battery therethrough up to a current value of about one and one-half amperes and with the connection shown the rectifier must be of a size adequate to withstand the full battery voltage. However, it has been found that a moderate size rectifier will serve even with this permanent connection.

Considering now the functioning of the system shown in Fig. 1, the generator 1 when accelerated to a speed such that it is able to charge the battery initially supplies the battery through the coil 5 and rectifier 6 and continues to do so until the current supply attains a given value, preferably predetermined as one and one-half amperes, whereupon the relay 3 responds to establish a direct connection between the battery and generator inclusive of the coil 4. This connection short-circuits the coil 5 and rectifier 6 and renders the coil 4 effective to hold relay 3 closed pending slowdown of the generator and consequent reduction of the charging current to a predetermined value whereupon the relay 3 releases to interpose between the generator and battery the rectifier and the coil 5. Thus with a properly designed relay and properly selected rectifier the system may be made to utilize the supply from the generator to a greater degree and with more reliable protection against discharge from the battery to the generator than with a reverse current relay, even assuming a high degree of sensitivity of such relay.

Referring to Fig. 2, the system comprises the elements 1 to 6 of Fig. 1 and the same connections except for inclusion in circuit with coil 5 and rectifier 6 of the contacts of a relay 7. The relay 7 is normally open, thus interrupting the battery and generator connection through the rectifier and relieving the latter of voltage when the generator is idle. The relay 7 has a closing coil connected across the generator brushes and when the voltage of the generator rises to a given value preferably closely approximating the battery voltage said relay responds to render the system operable in the same manner as the system of Fig. 1. Since in this case the rectifier is not included in circuit until the generator voltage closely approaches the battery voltage it is not required to withstand any great battery voltage, and accordingly the rectifier may be materially smaller, or in other words it may be formed of a smaller number of disks. On the other hand, this saving in size of the rectifier involves the addition of a relay.

As will be understood, the current value attained prior to response of the relay 3 may be predetermined as desired and it will be found that employment of the rectifier has advantages even though it is not used to pass current of the value suggested. Also it is to be understood that where the additional relay of Fig. 2 is employed it may be designed and adjusted to respond and release at any desired voltage values.

What we claim as new and desire to secure by Letters Patent is:

1. In combination a storage battery, a generator, a rectifier, means responsive at a given generator voltage to establish a charging connection between said generator and said battery inclusive of said rectifier to limit the flow of current in said connection to charging current, said means interrupting said connection when the generator voltage falls to a predetermined value and means responsive to a given current flow through said connection to establish a charging connection exclusive of said rectifier, the latter means being operative at a given low value of current in the latter connection to interrupt the same.

2. In combination, a storage battery, a generator, normally open charging connections therebetween, electroresponsive means controllable by unidirectional current for automatic operation to complete said connections and to interrupt said connections, and other connections between said generator and said battery including a rectifier which freely passes current from said generator to said battery, the last mentioned connections and the first mentioned connections affording control circuits for said electro-responsive means.

3. In combination, a storage battery, a generator, normally open charging connections therebetween, other connections between said generator and said battery including a rectifier which freely passes current from said generator to said battery and electroresponsive means to establish and to interrupt the first mentioned connections and controllable therefor by current traversing the first mentioned connections and the second mentioned connections in charging direction, the second mentioned connections being ineffective for control of said means while the first mentioned connections are completed.

4. In combination, a storage battery, a generator, normally open charging connections therebetween, an electroresponsive relay controllable by unidirectional current, namely current flowing in charging direction to complete and interrupt said connections, said relay having a plurality of windings, one being subjected to the current flow in said connections to hold said relay in circuit closing position and another connection between said generator and said battery including a second winding of said relay and further including a rectifier which passes current in charging direction, the latter winding being responsive to effect operation of said relay to complete said charging connections and being shunted by said charging connections when completed.

EDWIN W. SEEGER.
FRANK J. RUSSELL.